Figure 1:
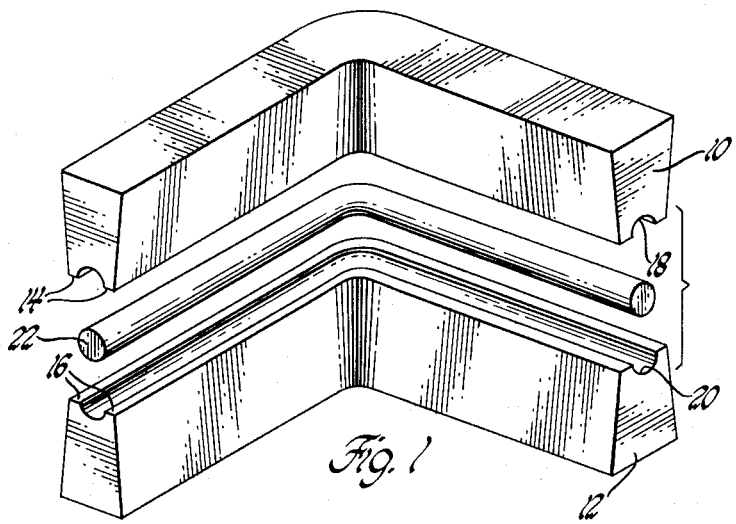

May 12, 1964  T. G. THOMAS  3,133,178
METHOD OF FUSING METAL ARTICLES
Filed July 21, 1961

INVENTOR.
Thomas G. Thomas
BY
Peter P. Kozak
ATTORNEY

United States Patent Office 3,133,178
Patented May 12, 1964

3,133,178
METHOD OF FUSING METAL ARTICLES
Thomas G. Thomas, Bedford, Ind., assignor to General Motors Corporation, Detroit, Mich., a corporation of Delaware
Filed July 21, 1961, Ser. No. 125,774
8 Claims. (Cl. 219—9.5)

This invention relates to a method for joining metals and more particularly to a method of joining aluminum members.

The use of aluminum is becoming increasingly more prevalent in the manufacture of relatively heavy and complex articles such as, for example, internal combustion engine heads and cylinder blocks containing water coolant passages and the like. Wherever possible, in the interest of economy and improved products, it is the usual practice to employ die casting techniques for the fabrication of aluminum products and product components. In many instances, complex bodies may be die cast if appropriately designed. In other instances, due to the fact that die casting procedures generally require that internal passages of castings to be formed by means of permanent cores associated with the dies are withdrawn from the casting in the course of ejecting the casting, the casting of complex bodies such as aluminum cylinder heads and blocks containing internal coolant passages by die casting procedures is impossible unless these bodies are cast in separate components of suitable design which are subsequently welded or otherwise joined together. The joining of relatively heavy sections such as aluminum engine block components presents significant problems because of difficulties involved in uniformly raising thick metal sections to be joined to welding temperatures.

It is the object of this invention to provide a method for welding relatively heavy sections of aluminum and similar relatively low melting temperature metals. It is a further object of this invention to provide a method for welding relatively heavy sections of aluminum or the like in which the abutting surfaces of the parts to be joined are brought uniformly and simultaneously to welding temperatures along the entire length of the seam to be joined and in which the parts to be joined are heated and melted substantially only in the immediate vicinity of the interface of the parts being joined.

These and other objects of the invention are accomplished in connection with the joining of component parts of an internal combustion engine cylinder head or block. In accordance with the invention a longitudinal groove is provided at the interface of the abutting portions of the aluminum parts to be joined. The groove is filled with a wire or rod of a higher melting point metal such as steel. The parts are assembled and thereafter the wire is subjected to induction heating of sufficient magnitude to cause the surrounding aluminum to melt and fuse to thereby effect a welded joint in the proximity of the heated rods.

Figure 2:
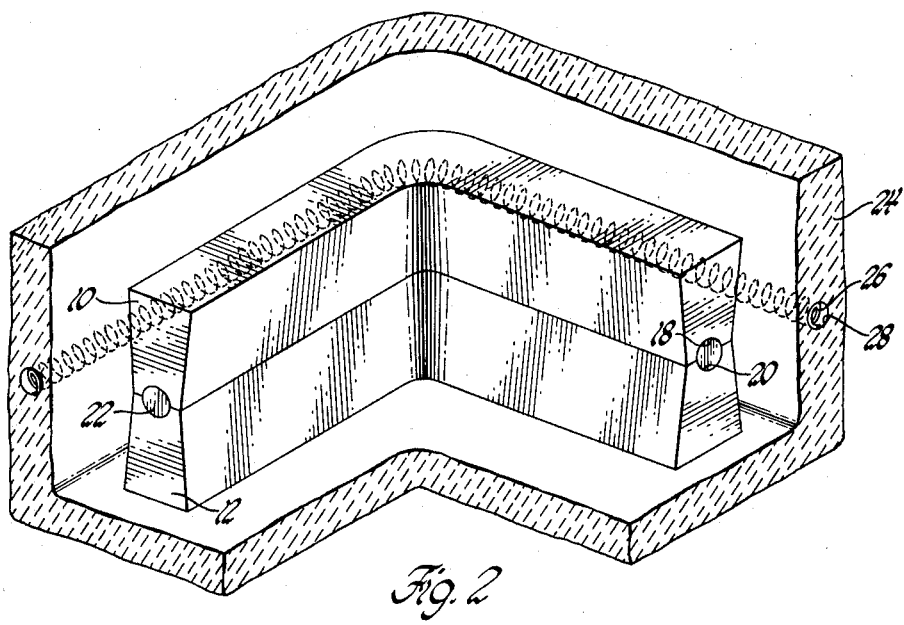

Other objects and advantages of the invention will be apparent from the following detailed description thereof made with reference to the drawings, in which:

FIGURE 1 is an exploded perspective view of a pair of aluminum sections to be joined in accordance with this invention; and FIGURE 2 is a perspective view of the aluminum sections associated with the induction heating apparatus shown in schematic form arranged for carrying out the method of this invention.

This invention is concerned principally with a method of manufacturing complex aluminum shapes such as aluminum cylinder blocks and heads having coolant passages and the like therein by a technique which preferably employs die casting as a foundry method for casting these components. In accordance with the more general aspects of this invention, the engine cylinder block or cylinder head is designed to be cast in two or more component parts to be subsequently joined together.

For the sake of simplicity in describing the invention, the complex aluminum shapes referred to above are shown in FIGURE 1 to be represented by a pair of individually cast angle irons 10 and 12 having the mating faces 14 and 16 respectively designed to abut one another and be joined together to form a unitary article. In accordance with this invention there is provided a longitudinal groove 18 along the entire surface 14 of the section 10. Similarly, there is provided a longitudinal groove 20 along the entire surface 16 of the block 12. The grooves 18 and 20 are preferably formed so that they mate prefectly and from a longitudinal cavity of regular cross sectional configuration such as a square, rectangle, circle, etc., when the blocks 10 and 12 are assembled. A wire or rod 22 having a cross sectional configuration identical to that of the cavity formed by the grooves 18 and 20 when the sections 10 and 12 are in an assembled relation, is then placed in the groove 20 of the lower section 12. The upper section 10 is then assembled with the lower section 12 in a manner such that the wire 22 is completely and snugly enveloped within grooves 18 and 12 as shown in FIGURE 2.

The assembled blocks 10 and 12 are next placed in an induction heating furnace 24 which is shown in FIGURE 2 in fragmentary and somewhat schematic form. The induction furnace consists essentially of a coil of wire 26 embedded or contained within a passage 28 of the furnace which is formed of a suitable refractory material. The coil 26 is arranged to be located in close proximity to the rod 22 along its entire length when the assembly 10, 12 and 22 is positioned within the induction furnace. The coil 26 is energized to cause a magnetic field to be formed thereabout which cuts across the conductor 22 causing it to heat up rapidly as is well known in the art. The wire or rod 22 is formed of steel or similar ferrous metal having a relatively high electrical resistance so that it will heat rapidly and cause the aluminum in close proximity thereto to melt and fuse. It is preferred in the method of this invention that the portions 14 and 16 on either side of the rod 22 are of substantial dimension so that as the portions of the aluminum casting adjacent the rod 20 are caused to melt, they will not cause a collapse or dimensional change in the joined casting. On the other hand, these portions are made sufficiently thin so that the heat generated within the rod 22 is rapidly transmitted to the exterior portions of the casting. The aluminum melts substantially only adjacent the rod 22. The molten metal formed adjacent the rod 22 quickly flows along the interface of the surfaces 14 and 16 toward the outer surfaces of the casting. The effect of this is to transmit heat to the interface surfaces 14 and 16 to cause them to melt and fuse. When heat has been applied for a sufficient time to cause a fusion of the parts, the induction furnace is deenergized to cause an instant cessation of the heating. Solidification and cooling of the parts occurs very rapidly since a relatively small portion of the casting is heated during the heating process. Since the heating effect across the fusion interface is instantaneous and uniform and since the cooling effect is likewise instantaneous and uniform, a highly satisfactory joint is achieved.

Preferably the castings 10 and 12 are die cast so as to be provided with the grooves 18 and 20. Thus, no machining or other extensive operation other than cleaning and the removal of flash, burs and the like from the surfaces to be joined is necessary. However, these grooves may be formed in any desired manner and in any shape which will receive a satisfactory resistance wire. In some instances where the geometry of the resistance wire permits, as for example, in the case of a wire having a rectangular cross section, it is sufficient to form a groove for receiving the electrical resistance wire 22 in only one of the members.

While the embodiment of the present invention as disclosed herein constitutes a preferred form, it is to be understood that other forms may be adopted without departing from the scope of the invention.

I claim:

1. A method of making a metal body including a first part and a second part joined at a seam comprising the steps of forming a groove in at least one of said parts along said seam, filling said groove with a second metal having a relatively high electrical resistance whereby said metal is in contact with each of said parts at said seam, said metal having a melting point which is substantially greater than the metal of said body, and subjecting said second metal to induction heat whereby the adjacent faces of said parts along said seam are caused to melt and fuse.

2. A method of making an aluminum body including a first part and a second part joined at a seam comprising the steps of forming a groove in at least one of said parts along the entire length of said seam, filling said groove with a ferrous metal wire having a relatively high electrical resistance whereby said ferrous metal wire is in contact with each of said parts at said seam, and subjecting said wire to induction heat whereby the adjacent faces of said parts are caused to melt and fuse.

3. A method of welding together at least two aluminum sections of substantial thickness comprising the steps of forming surfaces on each of said sections adapted to engage one another and be welded together, providing a groove along the length of at least one of the surfaces, filling said groove with a relatively high melting point high electrical resistance wire whereby said wire is in contact with each of said parts at said surfaces, subjecting said wire to induction heating for a time sufficient to cause the heat generated in the wire to melt the aluminum in the vicinity there, and cooling said parts to effect a welding of the parts at said surfaces.

4. A method of welding together at least two aluminum sections of substantial thickness comprising the steps of casting said sections to have surfaces adapted to engage one another and be welded together, said surfaces being cast to have a groove along the length of at least one of said surfaces, filling said groove with a ferrous metal high electrical resistance wire, subjecting said wire to induction heat for a time sufficient to cause the heat generated in the wire to melt the aluminum in the vicinity thereof, and cooling said parts to effect a welding of the parts.

5. A method of making cast structures of relatively low melting point metals comprising the steps of casting at least two of said metal parts adapted to be joined at abutting longitudinal portions thereof, at least one of said castings being cast having a groove extending along said portions, filling said groove with a ferrous metal high electrical resistance body whereby said ferrous metal body is in contact with each of said parts at said abutting portions, subjecting said body to induction heat for a time sufficient to cause the metal in the immediate vicinity of the ferrous metal body to melt and fuse, and cooling said parts whereby said parts are welded together.

6. A method of making cast aluminum structures comprising the steps of casting at least two aluminum parts adapted to be joined at abutting longitudinal portions thereof, each of said castings being cast with corresponding grooves along the entire length of the abutting surfaces to be joined, filling said grooves with a ferrous metal high electrical resistance body whereby the ferrous metal is in contact with each of said castings at said abutting portions, subjecting said ferrous body to induction heat for a time sufficient to cause the metal in the immediate vicinity of the wire to melt and fuse, and cooling said parts whereby said parts are welded together.

7. A metal structure comprising at least two cast relatively low melting temperature metal bodies welded together at a seam, and a ferrous metal body having dimensions substantially smaller than those of said seam embedded along the length of said seam at the interface thereof.

8. A metal structure comprising at least two relatively low melting temperature metal bodies welded together at a seam, and a different metal body having dimensions substantially smaller than those of said low melting temperature metal bodies at said seam embedded along the length thereof and at the interface thereof, said different metal body having a melting point substantially greater than the melting point of said low melting temperature metal bodies and having relatively high electrical resistance.

References Cited in the file of this patent

UNITED STATES PATENTS

| | | |
|---|---|---|
| 1,123,308 | Kichlighter | Jan. 5, 1915 |
| 1,369,919 | Eliel | Mar. 11, 1921 |
| 1,539,593 | Phelps | May 26, 1925 |
| 1,939,395 | Hughes | Dec. 12, 1933 |
| 2,618,726 | Cameron | Nov. 18, 1952 |
| 2,697,162 | Quandt | Dec. 14, 1954 |
| 2,739,829 | Pedlow et al. | Mar. 27, 1956 |
| 2,764,267 | Hyland | Sept. 25, 1956 |

UNITED STATES PATENT OFFICE
CERTIFICATE OF CORRECTION

Patent No. 3,133,178            May 12, 1964

Thomas G. Thomas

It is hereby certified that error appears in the above numbered patent requiring correction and that the said Letters Patent should read as corrected below.

Column 2, line 16, for "from" read -- form --; column 3, line 39, for "there" read -- thereof --.

Signed and sealed this 29th day of September 1964.

(SEAL)
Attest:

ERNEST W. SWIDER            EDWARD J. BRENNER
Attesting Officer            Commissioner of Patents